United States Patent [19]

Ito

[11] Patent Number: 5,430,556
[45] Date of Patent: Jul. 4, 1995

[54] QUANTIZING AND DEQUANTIZING CIRCUITRY FOR AN IMAGE DATA COMPANDING DEVICE

[75] Inventor: Kenji Ito, Asaki, Japan

[73] Assignee: Fuji Photo Film Co., Ltd., Kanagawa, Japan

[21] Appl. No.: 170,768

[22] Filed: Dec. 21, 1993

[30] Foreign Application Priority Data

Dec. 22, 1992 [JP] Japan .................................. 4-341988

[51] Int. Cl.⁶ .................. H04N 1/46; H04N 7/12; G06K 9/40; G06K 9/36
[52] U.S. Cl. ........................... 358/427; 358/479; 382/246; 382/251; 348/415
[58] Field of Search .......... 358/479, 427, 136; 382/54, 56

[56] References Cited

U.S. PATENT DOCUMENTS

| | | | |
|---|---|---|---|
| 4,837,628 | 6/1989 | Sasaki | 358/209 |
| 5,025,482 | 6/1991 | Murakami | 382/56 |
| 5,237,410 | 8/1993 | Inoue | 358/136 |
| 5,295,077 | 3/1994 | Fukuroka | 358/479 |

Primary Examiner—Edward L. Coles, Sr.
Assistant Examiner—John Ning

[57] ABSTRACT

In quantizing and dequantizing circuity for an image data companding device, a selective inputting circuit selects either of image data undergone orthogonal transform and data undergone decoding. A multiplier multiplies the data selected by the inputting circuit by quantization coefficients or reciprocals thereof for dequantization or quantization. The quantization coefficients or the reciprocals thereof are rewritably stored in a RAM (Random Access Memory) in matching relation to input data and transferred from the RAM to the multiplier. The quantization coefficients are read out of a look-up table which stores a plurality of kinds of quantization coefficients. A ROM (Read Only Memory) stores the reciprocals of quantization coefficients beforehand. In the event of quantization, particular reciprocals matching quantization coefficients fed from the outside are read out of the ROM and transferred to the RAM. At the time of dequantization, the quantization coefficients fed from the outside are directly written to the RAM. Such hardware processing using multiplication implements quantization and dequantization with a common circuit at high speed.

16 Claims, 3 Drawing Sheets

QUANTIZING AND DEQUANTIZING CIRCUITRY FOR AN IMAGE DATA COMPANDING DEVICE

BACKGROUND OF THE INVENTION

1. Field of the Invention

The present invention relates to quantizing and dequantizing circuitry for an image data companding device incorporated in a digital electronic still camera or similar imaging apparatus. The companding device built in a digital electronic camera, for example, selectively compresses image data representative of a scene picked up by the camera and stores the compressed data in a recording medium or reads them out of the medium and expands them.

2. Description of the Related Art

A camera of the kind described digitizes an image signal representative of a shot to generate corresponding digital image data. The digital image data are compressed to less than a desired amount of data by bidimensional orthogonal transform coding or similar coding scheme and then written to an image data recording medium, e.g., a semiconductor memory or a magnetic or optical disk. It has been customary with a bidimensional orthogonal transform coding to divide a single frame of image data into a predetermined number of blocks each having a predetermined size and transform the individual blocks of image data to data lying in the frequency domain, i.e., transform coefficients. The transform coefficients are each quantized by being divided by a quantization coefficient which matches the characteristic of the shot or picture. Specifically, a plurality of quantization coefficients are listed in a look-up table. A CPU (Central Processing Unit) or similar computing device selectively reads the quantization coefficients out of the look-up table and divides the transform coefficients thereby. The quantized transform coefficients are compressed by run-length coding and Huffman coding and then written to a recording medium. This kind of transform coding is successful in using the limited capacity of the recording medium efficiently. For details of compression coding including bidimensional orthogonal transform, a reference may be made to U.S. Pat. No. 5,184,229 to Saito et al. assigned to the same assignee as the present application.

The image data compressed by orthogonal transform coding may be read out of the recording medium and displayed on a monitor or similar display. In this case, the image data read out of the recording medium are decoded by Huffman decoding and then multiplied by a quantization coefficient used for quantization, i.e., dequantized to restore transform coefficients. The data in the frequency domain are restored by inverse orthogonal transform. As a result, the original image data are reconstructed and fed to a monitor.

The conventional quantizing and dequantizing procedure described above has some problems left unsolved, as follows. Since quantization and dequantization are executed by a CPU or similar computing device using software, they are time-consuming. Particularly, in the event of quantization, dividing orthogonal transform coefficients by a quantization coefficient needs a substantial period of time. To eliminate this problem, only the reciprocal of the quantization coefficient may be calculated by the CPU and downloaded to a RAM (Random Access Memory) or similar storage. Then, a multiplier can multiply orthogonal transform coefficients by the coefficient read out of the storage, thereby reducing the quantizing time. However, assuming a reciprocal derived from a quantization coefficient for 8-bit data, it is required to have accuracy higher than eight bits, e.g., sixteen bits in order to guarantee accurate computation. As a result, a substantial period of time is necessary for the reciprocal to be downloaded from the CPU to the RAM. Therefore, although a single circuit effecting both the quantization and the dequantization with a single multiplier and a RAM may be contemplated, the period of time for computing the reciprocal of the quantization coefficient and the period of time for downloading it from the CPU to the RAM make it difficult to implement such a common circuit scheme.

SUMMARY OF THE INVENTION

It is, therefore, an object of the present invention to provide quantizing and dequantizing circuitry for an image data companding device which performs quantization and dequantization with a single common circuit effectively.

In accordance with the present invention, in a companding device which divides first image data undergone orthogonal transform by quantization coefficients matching a characteristic of an image to quantize the first image data to thereby compress the first image data or multiplies second image data undergone orthogonal transform coding and decoded by a predetermined decoding method by quantization coefficients to dequantize the second image data to thereby expand the second image data, quantizing and dequantizing circuitry has a first input terminal for receiving the first image data, and a second input terminal for receiving the second image data. A selective input section selectively inputs the first image data from the first input terminal or the second image data from the second input terminal. A first storage stores rewritably either of quantization coefficients and reciprocals thereof transferred from the outside for quantization and dequantization. A control circuit controls the writing of the quantization coefficients or the reciprocals thereof in the first storage as instructed from the outside, and controls the reading of the quantization coefficients or the reciprocals thereof in response to input of the first or second image data. A multiplier multiplies the first or second image data selected by the selective input section by the quantization coefficients or reciprocals thereof read out of the first storage. A second storage stores beforehand reciprocals respectively matching quantization coefficients to be set from the outside. The control circuit writes, in the event of quantizing the first image data, the reciprocals stored in the second storage and matching the quantization coefficient set from the outside in the first storage or writes, in the event of dequantizing the second image data, the quantization coefficients set from the outside directly in the first storage. The reciprocals and quantization coefficients written to the first storage are transferred to the multiplier in response to input of the first and second image data.

Also, in accordance with the present invention, a companding device for selectively compressing image data to a predetermined amount of data or expanding compressed data to restore original image data has a compressing system, an expanding system, and a coefficient setting section. The compressing system has a data blocking section for dividing image data representative of one frame of image into a plurality of blocks of data each having a predetermined number of pixels, an orthogonal transform section for executing orthogonal transform with each of the blocks of data to develop first image data, a quantizing section for quantizing the first image data, and a coding section for coding the first image data dequantized by the quantizing section. The expanding system has a decoding section for decoding second image data coded by orthogonal transform coding, a dequantizing section for dequantizing the second image data decoded by the decoding section, and an inverse orthogonal transform section for executing inverse orthogonal transform with the second image data dequantized by the dequantizing section. The coefficient setting section sets, in response to the first image data from the orthogonal transform section or the second data from the decoding section, particular quantization coefficients matching the characteristic of the first or second image data in the quantizing section or the dequantizing section. The quantizing section and the dequantizing section are implemented by a common circuit. The common circuit is made up of a selective input section for selectively inputting the first image data undergone orthogonal transform or the second image data decoded, a first storage for storing either of quantization coefficients and reciprocals thereof for quantization and dequantization rewritably, a second storage for storing beforehand reciprocals of the quantization coefficients to be set by the coefficient setting section, a control circuit for controlling the transfer of either of the reciprocals stored in the second storage and the quantization coefficients set in the coefficient setting section to the first storage in the event of quantization or dequantization, and controlling the reading of the reciprocals or the quantization coefficients out of the first storage in response to input of the first or second image data, and a multiplier for multiplying the first or second image data from the selective input section with the reciprocals or the quantization coefficient read out of the first storage.

Furthermore, in accordance with the present invention, a digital electronic still camera of the type converting an image signal representative of a scene picked up to digital image data, compressing the digital image data to a predetermined amount, recording the resulting compressed image data in a recording medium, and reading the compressed image data out of the recording medium to expand them has a compressing system for compressing the image data, an expanding system for expanding the compressed image data, a look-up table listing a plurality of quantization coefficients, and a coefficient setting section. The compressing system comprises a data blocking section for dividing one frame of image data into a plurality of blocks of data each having a predetermined number of pixels, an orthogonal transform section for executing orthogonal transform with each of the blocks of data to develop first image data, a quantizing section for quantizing each of the blocks of data undergone orthogonal transform to develop second image data, and a coding section for coding the second image data to develop the compressed image data. The expanding section comprises a decoding section for decoding the compressed image data to develop third image data, a dequantizing section for dequantizing the third image data, and an inverse orthogonal transform section for executing inverse orthogonal transform with the third image data dequantized by the dequantizing section. The coefficient setting section selects, based on the first or third image data, the quantization coefficients each matching a characteristic of the first or second image data and sets the selected quantization coefficients in the quantizing section or the dequantizing section. The quantizing section and the dequantizing section are implemented by a common circuit. The common circuit is made up of a selective input section for selectively inputting the first image data or the third image data decoded, a first storage for storing either of quantization coefficients and reciprocals thereof for quantization and dequantization rewritably, a second storage for storing beforehand reciprocals of quantization coefficients to be set by the coefficient setting section, a control circuit for controlling the writing of the reciprocals of the second storage or the quantization coefficients of the coefficient setting section in the first storage in the event of quantization or dequantization, and controlling the reading of the reciprocals or the quantization coefficients out of the first storage in response to input of the first or third image data, and a multiplier for multiplying the first or third image data from the selective input section with the reciprocals or the quantization coefficients read out of the first storage.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
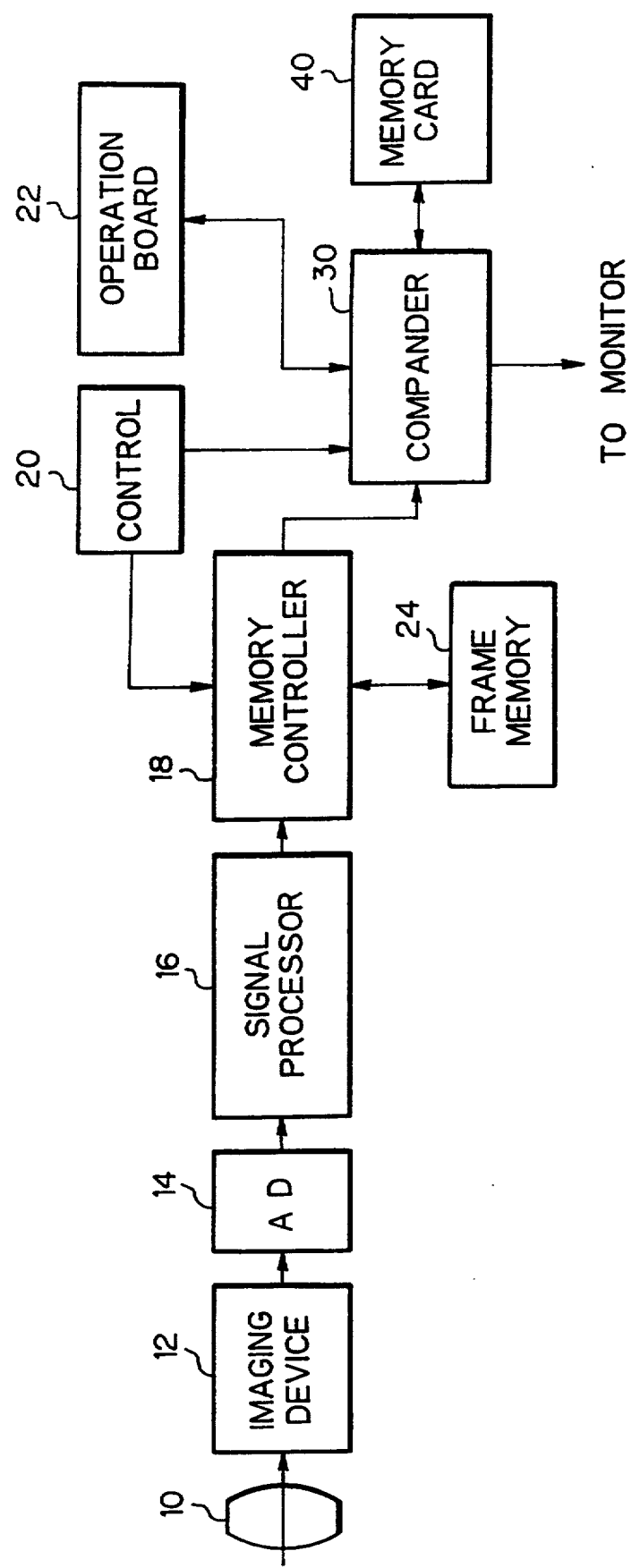
FIG. 1 is a block diagram schematically showing an electronic still camera with which quantizing and dequantizing circuitry embodying-the present invention and applicable to an image data companding device is practicable.

Referring to FIG. 1 of the drawings, a digital electronic still camera is schematically shown which includes an image data companding device implemented with quantizing and dequantizing circuitry embodying the present invention. As shown, the camera includes an imaging device 12 for shooting a desired scene and generating an image signal representative of the scene. The image signal is fed from the imaging device 12 to a companding device, or compander, 30 in the form of digital data by way of an analog-to-digital converter (ADC) 14, a signal processor 16, and a memory controller 18. The compander 30 compresses the image data and writes the resulting data in a memory card 40. In the event of expansion, the compander 30 reads the compressed image data out of the memory card 40, expands the data, and then feeds them to a monitor or similar display, not shown.

The imaging device 12 is advantageously implemented by a CCD (Charge Coupled Device) or similar solid state imaging device. The imaging device 12 shoots a desired scene incident thereon via a lens 10 and generates R (red), G (green) and B (blue) color image signals representative of the scene. While the still camera, of course, includes an exposing mechanism, focusing mechanism and other conventional mechanisms, such mechanisms will not b e described specifically since they are not relevant to the understanding of the present invention. The memory card 40 is a storage medium made up of a card-like base, and an SRAM. (Static RAM) or similar semiconductor device supported by the base. The memory card 40 may advantageously be removably mounted on the camera.

The analog R, G and B color signals from the imaging device 12 are fed to the ADC 14 and converted to corresponding digital data thereby. Specifically, the ADC 14 digitizes each of the color signals to ten bits of dam. The output of the ADC 14 is connected to the signal processor 16. In the illustrative embodiment, the signal processor 16 executes various kinds of conventional preprocessing, including white balance adjustment and tone correction, and transforms the digital R, G and B data to luminance data (Y) and chrominance data (C). In the embodiment, the Y data and C data are each represented by eleven bits of digital data provided with a code. The output of the signal processor 16 is connected to a frame memory 24 via the memory controller 18. The memory controller 18 plays the role of a data control circuit for sequentially writing the image data fed from the signal processor 16 in the frame memory 24, reading the data out of the memory 24, and sequentially delivering them to the compander 30. The memory controller 18 and compander 30 are controlled by a control section 20 having a main control circuit therein. The compander 30 writes or reads data in or out of the memory card 40 in response to a command entered by the operator on an operation board 22.

Figure 2:
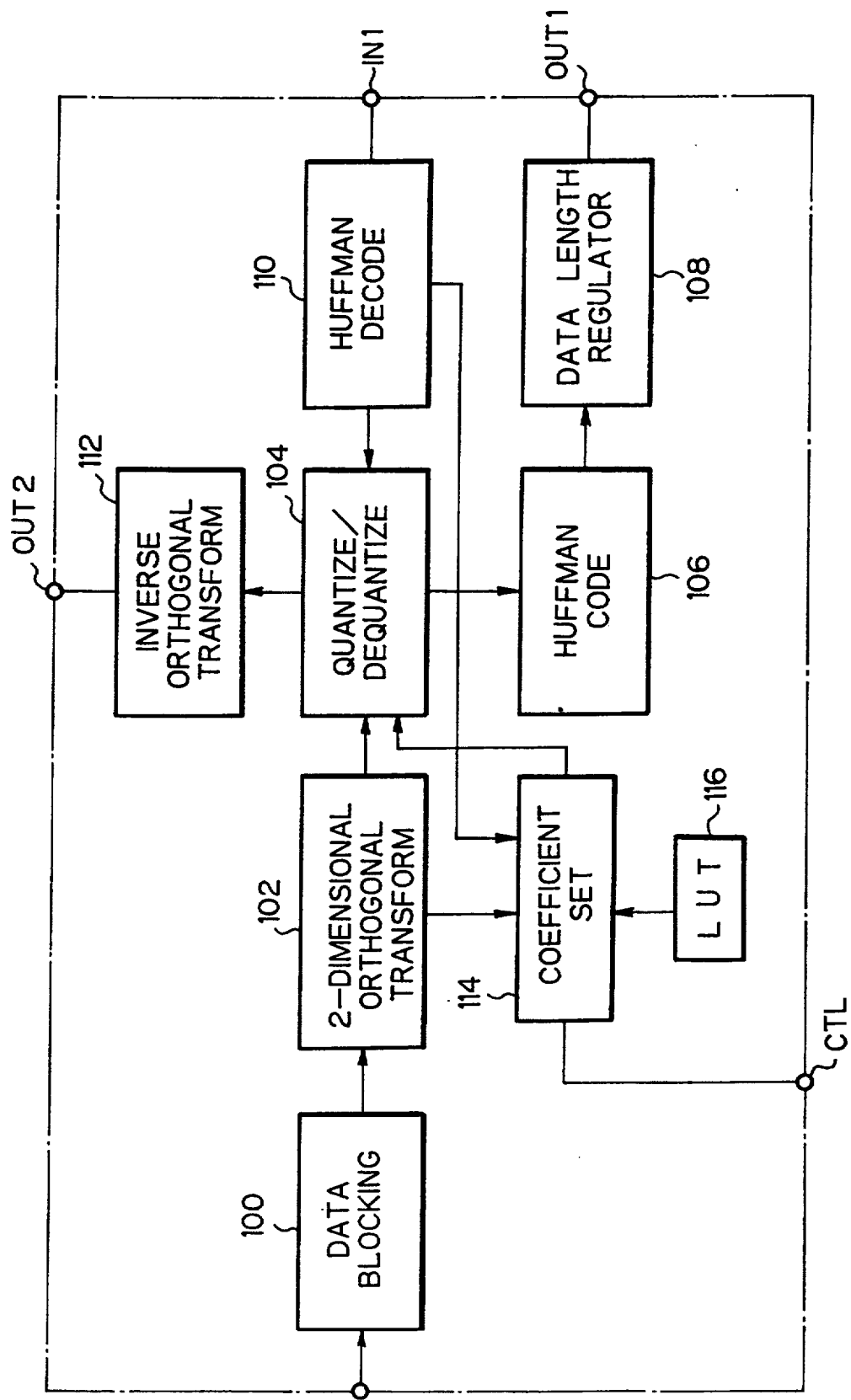
FIG. 2 is a block diagram schematically showing a specific construction of the companding device included in the camera of FIG. 1.

A reference will be made to FIG. 2 for describing the compander 30 in detail. The compander 30 is generally made up of a compressing system and an expanding system. As shown in FIG. 2, the compressing system consists of a data blocking section 100, a bidimensional orthogonal transform section 102, a quantizing section 104, a Huffman coding section 106, and a data length regulator section 108. The expanding system has a Huffman decoding section 110, a dequantizing section 104, and an inverse orthogonal transform section 112. Also included in the compander 30 are a coefficient setting section 114 and a look-up table (LUT) 116. In the illustrative embodiment, it is noteworthy that the quantizing section and the dequantizing section are implemented as a common circuit 104.

The data blocking section 100 includes a frame buffer although not shown specifically. As image data representative of a single picture are input to the frame buffer, the data blocking section 100 divides them into a plurality of blocks, or matrices, of data, each having a predetermined number of pixels, e.g., 8×8 pixels. The bidimensional orthogonal transform section 102 executes bidimensional orthogonal transform with the image data block by block. For this purpose, use may be made of discrete cosine transform, Hadamard transform or similar conventional orthogonal transform scheme. Each block of image data undergone the orthogonal transform are arranged vertically and horizontally in the ascending order with respect to frequency and then sequentially output. At this instant, image data associated with a DC component is output first. Specifically, assuming a single block, the image data produced by bidimensional orthogonal transform, i.e., transform coefficients are sequentially applied to the quantizing and dequantizing section 104 in the order of a DC component, lower AC frequency components, and higher AC frequency components.

In the event of quantization, the quantizing and dequantizing section 104 quantizes the transform coefficients and rounds them, as follows. In the imaging art, it has been customary to quantize a transform coefficient by dividing it by a step value matching a quantization coefficient. In the illustrative embodiment, the transform coefficients are each multiplied by the reciprocal of a quantization coefficient, as will be described specifically later. Further, the section 104 compares the individual quantized coefficients with a predetermined threshold value and omits the portions of the former smaller than the latter by rounding them. To determine a quantization coefficient, the activities of individual blocks, i.e., block activities of the entire frame are summed up to produce a total activity, as will also be described in detail later. The coefficient setting section 114 delivers such a quantization coefficient to the quantizing and dequantizing section 104.

The blocks of data quantized by the quantizing and dequantizing section 104 are each scanned zigzag in the ascending order with respect to frequency and then applied to the Huffman coding section 106. The Huffman coding section 106 codes the transform coefficients fed from the quantizing section 104. At this instant, the AC components of the transform coefficients often appear in the form of continuous sequences of zeros. Hence, the coding section 106 determines the runlengths of zeros and the amplitudes of non-zeros and then codes them by Huffman coding. The resulting block-by-block image data from the coding section 106 are delivered to the data length regulator section 108. The data length regulator section 108 regularizes the lengths of the variable-length, individual Huffman coded data to, for example, fixed-length, eight-bit data by filling their bits. Specifically, the data length regulator section 108 has a code amount control function such that when the total amount of data of a given block, which is made up of a DC component and a plurality of AC components, has exceeded a predetermined amount, the data length regulator section 108 discards the subsequent data on the basis of a bit distributing schedule dependent on the specific characteristics of the picture to thereby confine the amount of codes in a predetermined range. The resulting outputs of this section 108 are written to the memory card or similar recording medium 40, FIG. 1, via an output terminal OUT1.

On the other hand, the compressed image data are read out of the memory card 40, FIG. 1, and applied to the decoding section 110 via an input terminal IN1. The decoding section 110 decodes the individual input data by Huffman coding and delivers the decoded data to the quantizing and dequantizing section 104. In response, the dequantizing section 104 dequantizes each of the decoded data by multiplying it by a particular quantization coefficient used for quantization previously. The dequantized data from the dequantizing section 104 are fed to the inverse orthogonal transform section 112. The inverse orthogonal transform section 112 reconstructs the image data by use of an algorithm opposite to the transform algorithm of the bidimensional orthogonal transform section 102. The reconstructed image data are sent from the transform section 112 to, for example, a monitor via a monitor output terminal OUT2.

The blocks of data are applied from the bidimensional orthogonal transform section 102 or the Huffman decoding section 110 to the coefficient setting section 114. In response, the coefficient setting section 114 determines quantization coefficients for the individual blocks and delivers them to the quantizing and dequantizing section 104. To determine quantization coefficients, the section 114 references the look-up table 116 stored in a ROM (Read Only Memory) or similar storage, not shown. Specifically, in the event of compression, the coefficient setting section 114 calculates an activity, i.e., the proportion of high frequency image data to the entire image data block by block. In the illustrative embodiment, to produce such a block activity, the values of the pixel data constituting a single block are each compared with the mean value of the pixel data, and the absolute values of the resulting differences are added up. The resulting block activities are sequentially summed up to the end of a single frame so as to produce a total activity, as mentioned earlier. Quantization coefficients are determined on the basis of the total activity, i.e., quantization coefficients matching the total activity is read out of the look-up table 116. If desired, the coefficient setting section 114 may change the quantization coefficients read out of the table 116 on the basis of the number of blocks of image data constituting the entire frame. This will match the quantization coefficient to picture more desirably.

The look-up table 116 lists, for example, 256 different kinds of quantization coefficients represented by eight bits each. In the event of dequantization, quantization coefficients used for quantization previously are read out of the table 116 on the basis of indication data included in the individual blocks and then set in the coefficient setting section 114. To effect quantization or dequantization selectively, a command signal is entered on the operation board 22 and fed to the coefficient setting section 114 via, for example, a control terminal CTL.

Figure 3:
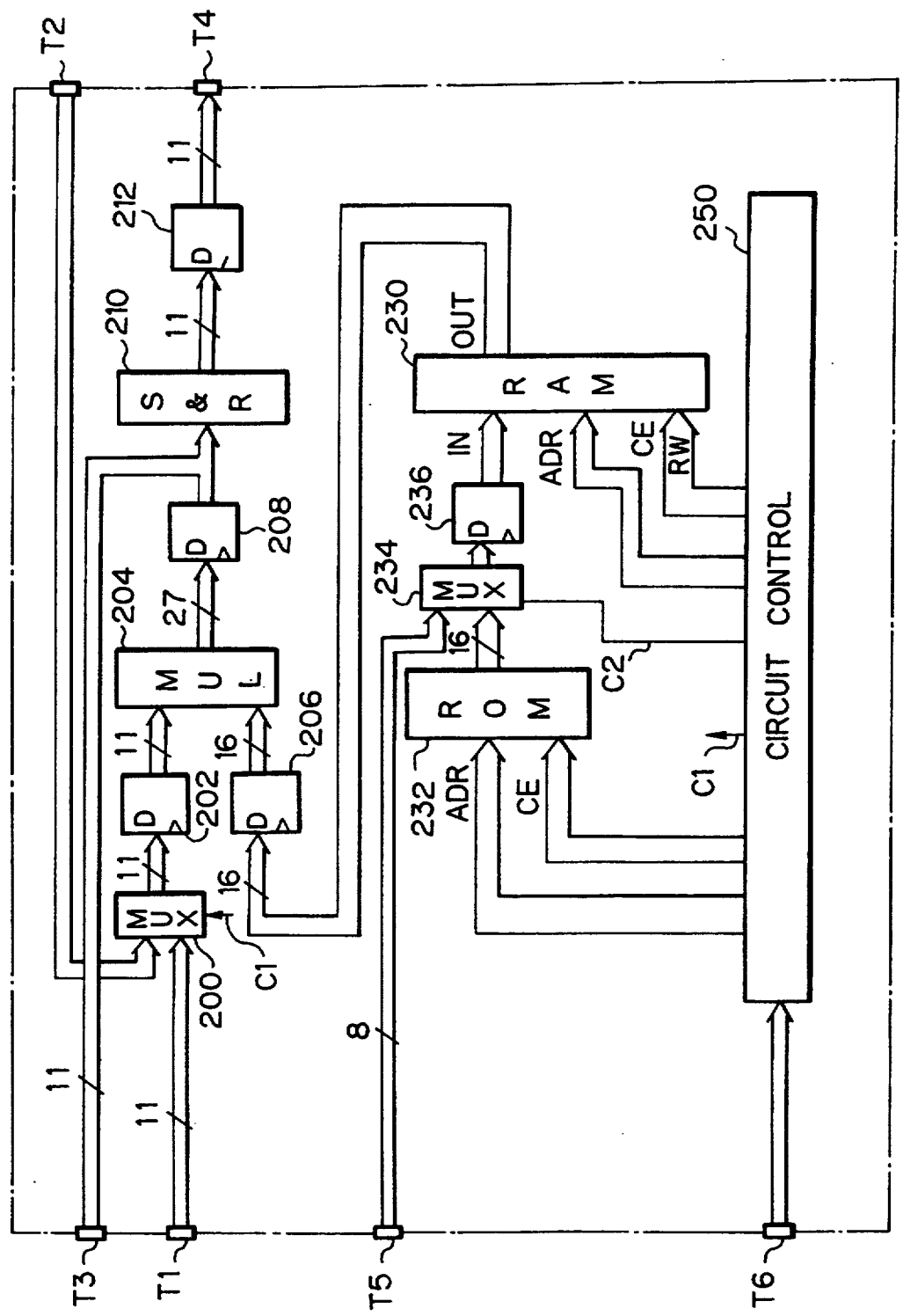
FIG. 3 is a schematic block diagram showing an embodiment of the quantizing and dequantizing circuitry in accordance with the present invention.

A reference will be made to FIG. 3 for describing a specific construction of the quantizing and dequantizing section 104. As shown, this section 104 includes a first input terminal T1 and a second input terminal T2 to which data undergone orthogonal transform and decoded data, respectively, are applied. The input terminals T1 and T2 are each connected to a first input selector or multiplexer (MUX) 200 by a respective bus having eleven bits; that is, an 11-bit orthogonal transform coefficient with a code is .applied to each of the input terminals T1 and T2. The input selector 200 is implemented as a selector having two inputs and one output and selects either of the data from the two input terminals T1 and T2. The data selected by the input selector 200 is delivered to a multiplier (MUL) 204 via a first latch circuit 202. The multiplier 204 receives a transform coefficient at one input thereof and receives a quantization coefficient or the reciprocal thereof at the other input via a second latch circuit 206 and multiplies them. The resulting product data is fed from the multiplier 204 to an output terminal T3, which is connected to the inverse orthogonal transform section 112, or to a shift and round (S & R) circuit 210 via a third latch circuit 208.

The data applied to the shift and round circuit 210 as mentioned above is the data to be quantized. For example, the multiplier 204 multiplies an 11-bit transform coefficient and the reciprocal of a 16-bit quantization coefficient and delivers the resulting 27-bit data to the shift and round circuit 210. The shift and round circuit 210 converts the 27-bit data to, for example, 11-bit data. In this case, the circuit 210 rounds the twelfth bit of the data and cuts away the rest. The rounded data is routed through a fourth latch circuit 212 to an output terminal T4 which is connected to the Huffman coding section 106, FIG. 2.

A RAM, or first storage, 230 is connected to the-multiplier 204 via the second latch circuit 206. Quantization coefficients or the reciprocals thereof are transferred from the RAM 230 to the multiplier 204. In the illustrative embodiment, the RAM 230 has a capacity of 256×16 bits and can store 256 different kinds of quantization coefficients and their reciprocals rewritably for the quantization or dequantization purpose. Further, in the embodiment, the reciprocals of quantization coefficients are stored in a ROM, or second storage, 232 beforehand. The ROM 232, like the RAM 230, has a capacity of 256×16 bits. Specifically, the reciprocals of the 256 kinds of quantization coefficients listed in the look-up table 116, FIG. 2, are stored in the ROM 232 and represented by sixteen bits each. The reciprocals are transferred from the ROM 232 to the RAM 230 by way of a second input selector (MUX) 234 and a fifth latch circuit 236. The second input selector 234 receives the reciprocals from the ROM 232 at one input and receives the quantization coefficients at the other input via an input terminal T5 connected to the coefficient setting section 114, FIG. 2.

The input selectors 200 and 234, ROM 230 and RAM 232 are controlled by a circuit control section 250. The circuit control section 250 receives a control signal from the coefficient setting section 114 via a control input terminal T6. In response, the control section 250 determines which of the Huffman coding section 110, FIG. 2, and the bidimensional orthogonal transform section 102, FIG. 2, is to deliver data thereto. Based on the result of this decision, the control section 250 sends a switching signal C1 to the input selector 200 and, at the same time, switches the second input selector 234 with a control signal C2 to cause it to select quantization coefficients from the coefficient setting section 114 or the reciprocals of quantization coefficients read out of the ROM 232. To read the reciprocals out of the ROM 232, the control section 250 feeds, among the addresses of the ROM 232, the addresses ADR storing reciprocals matching the quantization coefficients set in the coefficient setting section 114, together with a chip enable signal CE. Further, the control section 250 feeds addresses ADR and a chip enable signal CE to the RAM 230 in the event when coefficients should be written to or read out of the RAM 230.

The electronic still camera having the above construction is operated as follows. To begin with, the imaging device 12 shoots a desired scene and generates corresponding analog R, G and B color image signals. The R, G and B color signals are converted to corresponding digital data by the ADC 14. The, R, G and B digital data are transformed to image data, e.g., luminance data and chrominance data by the signal processor 16 and sequentially written to the frame memory 24 via the memory controller 18. As one frame of image data representative of the scene are stored in the frame memory 24, the control section 20 controls the memory controller 18 to transfer the image data from the memory 24 to the compander 30.

The compander 30 sequentially writes the one frame of image data .received from the memory 24 in the frame buffer, not shown, included in the data block output section 100. The data block output section 100 divides the image data into blocks each having 8×8 pixels and sequentially delivers the data blocks to the bidimensional orthogonal transform section 102. In response, the transform section 102 performs bidimensional orthogonal transform with each of the data blocks. At this instant, the coefficient setting section 114 calculates the total activity of the entire image, reads quantization coefficients matching the total activity out of the look-up table 116, and then sends them to the quantizing and dequantizing section 104. In the quantizing and dequantizing section 104, the circuit control section 250 feeds the addresses ADR of reciprocals matching the quantization coefficients selected by the setting section 114 to the ROM 232 together with a chip enable signal CE. As a result, the reciprocals of the quantization coefficients are sequentially read out of the designated addresses of the ROM 232 and transferred to the RAM 230 via the input selector 234 and latch circuit 236. At this instant, the control section 250 sends write addresses ADR and a chip enable signal CE to the RAM 230, causing the reciprocals to be sequentially written to the predetermined addresses of the RAM 230.

Subsequently, data undergone orthogonal transform in the ascending order with respect to frequency are fed from the bidimensional orthogonal transform section 102 to the quantizing section 30. In response, the reciprocals of the quantization coefficients are read out of the RAM 230. The data from the bidimensional orthogonal transform section 102 are applied to one input of the multiplier 204 via the input selector 200 and first latch circuit 202. At the same time, the reciprocals read out of the RAM 230 are applied to the other input of the multiplier 204. In response, the multiplier 204 multiplies the input data and coefficients and delivers the resulting product data to the shift and round circuit 210 via the third latch circuit 208. On receiving the product data, the shift and round circuit 210 rounds the twelfth bit of the product and cuts away the rest, thereby producing 11-bit data. The 11-bit data is delivered to the Huffman coding section 106. The coding section 106 sequentially codes the quantized data by Huffman coding and feeds the resulting data to the data length fixing section 108. This section 108 regulates the individual data of each block to a predetermined length and sequentially sends them to the memory card 40 via the output terminal OUT1.

On the other hand, assume that the camera is used to read data out of the memory card 40 and output them to, for example, a monitor. When a playback button provided on the operation board 22 is pressed, compressed data are sequentially transferred from the memory card 40 to the compander 30, i.e., Huffman decoding section 110 via the input terminal IN1 and decoded thereby. At this instant, the coefficient setting section 114 reads matching quantization coefficients out of the look-up table 116 and downloads them to the quantizing and dequantizing section 104. In the quantizing and dequantizing section 104, the quantization coefficients are written to the RAM 130 via the second input selector 234 and latch circuit 236. The quantization coefficients are read out of the RAM 130 under the control of the circuit control section 250 and in response to the decoded data. The quantization coefficients are fed to the multiplier 204 via the second latch circuit 206. The multiplier 204 multiplies the decoded data and the quantization coefficients fed from the latches 202 and 206, respectively. As a result, the decoded data are sequentially dequantized and transferred to the inverse orthogonal transform section 112 via the third latch circuit 208 and output terminal T3. The inverse transform section 112 executes inverse orthogonal transform with the input data by using an algorithm opposite to the algorithm for orthogonal transform. The inversely transformed data are reconstructed and sent out to, for example, a monitor via the output OUT2.

As stated above, in the illustrative embodiment, the quantizing and dequantizing circuit 104 included in the compander 30 has a ROM 232 storing reciprocals matching quantization coefficients stored in the look-up table 116. Therefore, quantization can be done without using software otherwise needed for a CPU or similar computing device to calculate the reciprocal of a quantization coefficient. What is required for quantization is simply to download the values stored in the ROM 232 to the RAM 230 on the basis of the quantization coefficients set by the coefficient setting section 114; Hence, the coefficients can b e downloaded at substantially the same speed as quantization coefficients to be set at the time of dequantization. Further, the downloaded coefficients can be computed by hardware, i.e., by the multiplier 204 shared by quantization and dequantization. This is successful in effecting quantization and dequantization rapidly by use of a simple common circuit.

In summary, in accordance with the present invention, quantizing and dequantizing circuitry for an image data companding device has an extra storage storing reciprocals each matching a particular quantization coefficient to be set at the time of quantization. The circuitry, therefore, reduces the load of a CPU or similar computing device and the period of time necessary for the quantization coefficient to be downloaded. Moreover, since quantization is implemented by a circuit which is also used to effect dequantization, both the quantization and the dequantization can be effected by a simple circuit arrangement at high speed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, while the embodiment has been shown and described as storing quantization coefficients in the ROM 232, the ROM 232 may be replaced with a simple logic gate circuit in order to reduce the circuit scale.

What is claimed is:

1. In a compander for compressing inputted digital image data into compressed digital image data and expanding inputted compressed digital image data back into non-compressed form, a quant/dequant unit, for performing quantization and dequantization on unquantized/quantized transform coefficients of the inputted digital image data, respectively, the quant/dequant unit comprising:
  a non-volatile memory storing at least a first set of quantization coefficient reciprocals;
  a quantization coefficients input terminal;
  a buffer memory for storing temporarily one of (A) quantization coefficient-reciprocals received from the non-volatile memory and (B) quantization coefficients, the quantization coefficients being received from one of (i) the input terminal and (ii) the non-volatile memory; and
  coefficient selecting means for selecting one of a set of quantization coefficient-reciprocals and a set of quantization coefficients, respectively, that are to be stored temporarily in the buffer memory;

the coefficient selecting means selecting quantization coefficient-reciprocals as a function of the inputted digital image data and selecting quantization coefficients as a function of identifying data of the quantized transform coefficients;

wherein the quant/dequant unit dequantizes as a function of the quantization coefficients and quantizes as a function of the quantization coefficient-reciprocals respectively, stored in the buffer memory.

2. A quant/dequant unit as in claim 1, further including:

a multiplier, responsive to the coefficient selecting means, for multiplying quantization coefficients and transform coefficients during dequantization, and multiplying quantization coefficient reciprocals and transform coefficients to produce a product from which the quantized data will be determined as a function thereof.

3. A quant/dequant unit as in claim 1, wherein:

the coefficient selecting means selects quantization coefficients as a function an activity of the inputted digital image data.

4. A quant/dequant unit as in claim 2, wherein:

the multiplier outputs an $N+j$ bit product, N and j being integers, $N \geq 1$, $j \geq 2$; the quant/dequant unit further comprising:

round-off means, responsive to the multiplier, for rounding off at an $N+1$ bit and outputting rounded-off $N+j$ bit data; and truncator means, responsive to the round-off means, for truncating the rounded-off $N+j$ bit data to N bit data;

the N bit data being the quantized transform coefficients output by the quant/dequant unit.

5. Quantizing and dequantizing circuitry for use in a companding device selectively operative for quantizing first image data and dequantizing second image data, said circuitry comprising:

a first input terminal for receiving thereon the first image data;

a second input terminal for receiving thereon the second image data;

selecting means for selecting either of the first image data on said first input terminal and the second image data on said second input terminal;

first storing means for rewritably storing therein either of quantization coefficients and reciprocals of the quantization coefficients;

multiplying means interconnected to said first storing means for multiplying the first or second image data selected by said selecting means by an output of said first storing means;

second storing means for storing beforehand therein the reciprocals corresponding to the quantization coefficients; and control means for controlling said selecting means, first storing means and second storing means to cause said selecting means to select the first or second image data and provide said multiplying means with either of the reciprocals and quantization coefficients in accordance with quantization or dequantization, respectively;

said control means reading out, in the event of quantizing the first image data on said first input terminal, the reciprocals corresponding to the quantization coefficients matching a characteristic of the first image data from said second storing means and writing the reciprocals thus read out into said first storing means, and writing, in the event of dequantizing the second image data on said second input terminal, the quantization coefficients provided from outside said circuitry into said first storing means, said control means reading out the reciprocals or quantization coefficients from said first storing means to supply said multiplying means with the reciprocals or quantization coefficients thus read out in response to input of the first or second image data on said first or second input terminal, respectively.

6. Circuitry in accordance with claim 5, further comprising output means interconnected to said multiplying means for restricting a result from multiplication made by said multiplying means to a predetermined number of bits to output the predetermined number of bits.

7. A companding device for selectively compressing first image data representative of one frame of image to a predetermined amount of compressed data and expanding compressed second image data to restore original image data, said device comprising:

data partitioning means for dividing the first image data into a plurality of blocks of data each having a predetermined number of pixels;

orthogonal transforming means for executing orthogonal transform on each of the plurality of blocks of data to develop third image data;

quantizing means for quantizing the third image data;

coding means for coding the third image data quantized by said quantizing means;

decoding means for decoding the second image data to develop fourth image data;

dequantizing means for dequantizing the fourth image data;

inverse orthogonal transforming means for executing inverse orthogonal transform on the fourth image data dequantized by said dequantizing means; and coefficient setting means for setting, in response to the third image data from said orthogonal transforming means or the fourth image data from said decoding means, particular quantization coefficients matching a characteristic of the third or fourth image data, respectively;

said quantizing means and said dequantizing means comprising a common circuit comprising:

selecting means interconnected to said coding means and decoding means for selecting either of the third and fourth image data;

first storing means for rewritably storing therein either of quantization coefficients and reciprocals of the quantization coefficients;

multiplying means interconnected to said first storing means for multiplying the third or fourth image data selected by said selecting means with an output of said first storing means;

second storing means for storing beforehand the reciprocals corresponding to the quantization coefficients; and control means for controlling said selecting means, first storing means and second storing means to cause said selecting means to select the third or fourth image data and provide said multiplying means with either of the reciprocals and quantization coefficients in accordance with quantization or dequantization, respectively;

said control means causing, in the event of quantization, said second storing means to develop the reciprocals corresponding to the quantization coefficients set by said coefficient setting means to said first storing means, and, in the event of dequantization, said coefficient setting means to develop the quantization coefficients set by said coefficient setting means to said first storing means, said control means causing said first storing means to supply said multiplying means with an output from said first storing means in response to input of the third or fourth image data, to thereby quantize or dequantize the third or fourth image data selected by said selecting means, respectively.

8. A device in accordance with claim 7, further comprising storage means interconnected to said coefficient setting means for storing therein a look-up table listing the quantization coefficients, said coefficient setting means selectively reading the quantization coefficients out of said look-up table to set particular quantization coefficients matching a characteristic of the third or fourth image data.

9. A device in accordance with claim 7, further comprising output means interconnected to said multiplying means for restricting a result from multiplication made by said multiplying means to a predetermined number of bits to output the predetermined number of bits.

10. A device in accordance with claim 7, wherein said coefficient setting means sets quantization coefficients matching an activity of the third image data from said orthogonal transforming means.

11. A device in accordance with claim 7, wherein said coefficient setting means sets quantization coefficients designated in connection with the fourth image data from said decoding means.

12. A digital electronic still camera for picking up a scene to produce an image signal representative of the scene, converting the image signal to a frame of digital, first image data, compressing the first image data to a predetermined amount of compressed, second image data, recording the second image data in a recording medium, and reading the second image data out of the recording medium to expand the second image data to restore the first image data, said camera comprising:

data partitioning means for dividing a frame of the first image data into a plurality of blocks of data each having a predetermined number of pixels;

orthogonal transforming means for executing orthogonal transform on each of the plurality of blocks of data to develop third image data;

quantizing means for quantizing each of the blocks of the third image data;

coding means for coding the third image data quantized by said quantizing means to develop the second image data;

decoding means for decoding the second image data to develop fourth image data;

dequantizing means for dequantizing the fourth image data;

inverse orthogonal transforming means for executing inverse orthogonal transform on the fourth image data dequantized by said dequantizing means;

storage means for storing therein a look-up table listing quantization coefficients; and coefficient setting means for referencing, in response to the third image data from said orthogonal transforming means or the fourth image data from said decoding means, said lookup table and setting particular quantization coefficients matching a characteristic of the third or fourth image data, respectively;

said quantizing means and said dequantizing means comprising a common circuit comprising:

selecting means interconnected to said coding means and decoding means for selecting either of the third and fourth image data;

first storing means for rewritably storing therein either of quantization coefficients and reciprocals of the quantization coefficients;

multiplying means interconnected to said first storing means for multiplying the third or fourth image data selected by said selecting means with an output of said first storing means;

second storing means for storing beforehand the reciprocals corresponding to the quantization coefficients; and control means for controlling said selecting means, first storing means and second storing means to cause said selecting means to select the third or fourth image data and provide said multiplying means with either of the reciprocals and quantization coefficients in accordance with quantization or dequantization, respectively;

said control means causing, in the event of quantization, said second storing means to develop the reciprocals corresponding to the quantization coefficients set by said coefficient setting means to said first storing means, and, in the event of dequantization, said coefficient setting means to develop the quantization coefficients set by said coefficient setting means to said first storing means, said control means causing said first storing means to supply said multiplying means with an output from said first storing means in response to input of the third or fourth image data, to thereby quantize or dequantize the third or fourth image data selected by said selecting means, respectively.

13. In a compander for compressing inputted digital image data into compressed digital image data and expanding inputted compressed digital image data back into non-compressed form, the compander including a combined quant/dequant unit for performing quantization and dequantization on unquantized/quantized transformed coefficients of the inputted digital image data, respectively, a method of operating the combined quant/dequant unit comprising the steps of:

a) non-volatilely storing at least a first set of quantization coefficient reciprocals;

b) selecting one of a set of quantization coefficient-reciprocals and a set of quantization-coefficients, respectively, to be temporarily stored;

the step (b) of selecting including one of selecting quantization coefficient-reciprocals as a function of the inputted digital image data and selecting quantization coefficients as a function of identifying data of the quantized transformed coefficients, respectively;

c) temporarily storing one of (1) quantization coefficient reciprocals transferred from the non-volatile storage and (2) quantization coefficients, the quantization coefficients being received from one of (i) an external source and (ii) the nonvolatile storage; and d) performing one of quantizing as a function the quantization coefficient-reciprocals and dequantizing as a function of quantization coefficients using the coefficients or reciprocals, respectively, having been stored temporarily by step (c).

14. A method of operating a quant/dequant unit as in claim 13, further comprising the step of:
   e) multiplying one of (1) quantization coefficients and quantized transform coefficients, to produce the dequantized data, and (2) quantization coefficient-reciprocals and transform coefficients, to produce a product from which quantization will be determined as a function thereof.

15. A method of operating a quant/dequant unit as in claim 13, wherein:
   the step (b) of selecting includes selecting quantization coefficients as a function of an activity of the inputted digital image data.

16. A method of operating a quant/dequant unit as in claim 13, wherein:
   the step (e) of multiplying produces an $N+j$ bit product, N and j being integers, $N \geq 1$, $j \geq 2$;
   the method further comprising the steps of:
   f) rounding off an $N+1$ bit to produce rounded off $N+j$ bit data; and
   g) truncating the rounded-off $N+j$ bit data into N bit data;
   the N bit data being the quantized transform coefficients output by the method of operating the quant/dequant unit.

* * * * *